United States Patent
Kim et al.

(10) Patent No.: US 9,833,896 B2
(45) Date of Patent: Dec. 5, 2017

(54) WEARABLE ROBOT AND METHOD OF CONTROLLING THE SAME

(71) Applicant: Samsung Electronics Co., Ltd., Suwon-Si, Gyeonggi-Do (KR)

(72) Inventors: Ji Min Kim, Seoul (KR); Gyung Rock Kim, Yongin-si (KR); Jong Do Choi, Suwon-si (KR); Tae Sin Ha, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 249 days.

(21) Appl. No.: 14/556,772

(22) Filed: Dec. 1, 2014

(65) Prior Publication Data

US 2016/0229055 A1 Aug. 11, 2016

(30) Foreign Application Priority Data

Nov. 29, 2013 (KR) .......................... 10-2013-0146751

(51) Int. Cl.
*B25J 9/00* (2006.01)
*A61H 3/00* (2006.01)
(Continued)

(52) U.S. Cl.
CPC .............. *B25J 9/0006* (2013.01); *A61H 3/00* (2013.01); *A61H 1/024* (2013.01); *A61H 1/0244* (2013.01);
(Continued)

(58) Field of Classification Search
CPC ......... B25J 9/1633; B25J 9/0006; A61G 5/14; A61H 1/024; A61H 1/0266; A61H 1/0274;
(Continued)

(56) References Cited

U.S. PATENT DOCUMENTS

2004/0167641 A1* 8/2004 Kawai .................. A61B 5/1038
700/63
2008/0009771 A1* 1/2008 Perry ..................... B25J 9/0006
600/587
(Continued)

FOREIGN PATENT DOCUMENTS

KR 102006039970 A 5/2006

OTHER PUBLICATIONS

Parameter Optimization of a Signal Based Omni Directional Biped Locomotion Using Evolutionary Strategies by Baris Gokce and H. Levent Akin. RoboCup 2010: Robot Soccer World Cup XIV, 2011, Excerpt.*

(Continued)

*Primary Examiner* — Abby Lin
(74) *Attorney, Agent, or Firm* — Harness, Dickey & Pierce, P.L.C.

(57) ABSTRACT

There are provided a wearable robot and a method of controlling the same. The method includes obtaining a joint angle and a joint angular velocity of a plurality of joints, calculating a target joint angle of one joint among the plurality of joints using a joint angle and a joint angular velocity of at least one joint among the other joints, calculating assistive torque to be applied to the one joint using the calculated target joint angle, and outputting the calculated assistive torque to the one joint.

19 Claims, 11 Drawing Sheets

(51) Int. Cl.
*A61H 1/02* (2006.01)
*B25J 9/16* (2006.01)

(52) U.S. Cl.
CPC ...... *A61H 1/0266* (2013.01); *A61H 2201/165* (2013.01); *A61H 2201/5007* (2013.01); *A61H 2201/5061* (2013.01); *A61H 2201/5069* (2013.01); *G05B 2219/40305* (2013.01)

(58) Field of Classification Search
CPC .. A61H 1/0237; A61H 1/0244; A61H 1/0255; A61H 3/00; A61F 5/0102; A61F 5/01; G05B 2219/40305
See application file for complete search history.

(56) References Cited

U.S. PATENT DOCUMENTS

| | | | |
|---|---|---|---|
| 2009/0036815 A1* | 2/2009 | Ido | A61H 1/0237 602/23 |
| 2009/0319054 A1 | 12/2009 | Sankai | |
| 2010/0168919 A1* | 7/2010 | Okamoto | B25J 9/1643 700/275 |
| 2011/0071442 A1* | 3/2011 | Park | A61H 1/0262 601/35 |
| 2011/0306907 A1 | 12/2011 | Ashihara et al. | |
| 2012/0016276 A1* | 1/2012 | Doi | A61H 1/024 601/34 |
| 2013/0173059 A1* | 7/2013 | Lee | B25J 9/1633 700/261 |
| 2014/0058299 A1* | 2/2014 | Sankai | A61B 5/112 601/35 |

OTHER PUBLICATIONS

Tsukahara, A., et al., "Sit-to-Stand and Stand=to Sit Transfer Support Complete Paraplegic Patients with Robot Suit HAL", Advanced Robots. 2010, vol. 24, Issue 11.

Mefoued, S., et al., "Sit-to-Stand Movement Assistance Using an Actuated Knee Joint Orthosis," Biomedical Robotics and Biomechatronics (BioRob), 2012 4th IEEE RAS & EMBS International Conference, pp. 1753-1758.

* cited by examiner

WEARABLE ROBOT AND METHOD OF CONTROLLING THE SAME

CROSS-REFERENCE TO RELATED APPLICATION

This application claims the benefit of Korean Patent Application No. P2013-146751, filed on Nov. 29, 2013 in the Korean Intellectual Property Office, the entire disclosure of which is incorporated herein by reference.

BACKGROUND

1. Field

Example embodiments relate to a wearable robot and a method of controlling the same. At least some example embodiments relate to a wearable robot that applies assistive torque reflecting an intention of a wearer and a method of controlling the same.

2. Description of the Related Art

Wearable robots may have various purposes of, for example, aiding movement of the disabled or elderly by assisting with muscle strength while moving, rehabilitation therapy for patients of muscle diseases, assisting with heavy military gear worn by soldiers, and lifting of heavy loads in the field of industry.

In general, such wearable robots for supporting muscle strength may include an upper extremity assistant robot for moving an upper extremity and a lower extremity assistant robot for moving a lower extremity. Between the two robots, the lower extremity assistant robot is a robot that may be worn by a wearer on a lower half of their body and may reduce a muscle strength load of the wearer by applying assistive torque to a joint of, for example, a hip or a knee. The above wearable robot for assisting with the lower extremity muscle strength may assist with various motions in the wearer's daily life, such as walking along a flatland or a slope, going up and down stairs, and sitting down and standing up.

SUMMARY

Example embodiments provide a wearable robot and/or a method of controlling the same.

In some example embodiments, the wearable robot is configured to adjust assistive torque to be applied to each joint in real time by reflecting a motion intention of a wearer such as a motion speed change or motion stop, and a method of controlling the same.

Some example embodiments relate to a method of controlling a wearable robot.

In some example embodiments, the method includes obtaining a current joint angle and a current joint angular velocity of a plurality of joints; calculating a target joint angle of one joint among the plurality of joints using the current joint angle and the current joint angular velocity of at least one other joint among the plurality of joints; calculating assistive torque to be applied to the one joint using the calculated target joint angle of the at least one other joint; and outputting the calculated assistive torque to the one joint.

Other example embodiments relate to a wearable robot.

In some example embodiments, the wearable robot includes a plurality of joints; at least one sensor configured to measure current joint angles of the plurality of joints; and a controller. In some example embodiments, the controller is configured to obtain a current joint angular velocity of each joint using the measured current joint angles, calculate a target joint angle of one joint among the plurality of joints using the current joint angle and the current joint angular velocity of at least one other joint among the plurality of joints, and calculate assistive torque to be applied to the one joint using the calculated target joint angle.

BRIEF DESCRIPTION OF THE DRAWINGS

These and/or other aspects of the example embodiments will become apparent and more readily appreciated from the following description of some of the example embodiments, taken in conjunction with the accompanying drawings of which.

DETAILED DESCRIPTION

Figure 1:
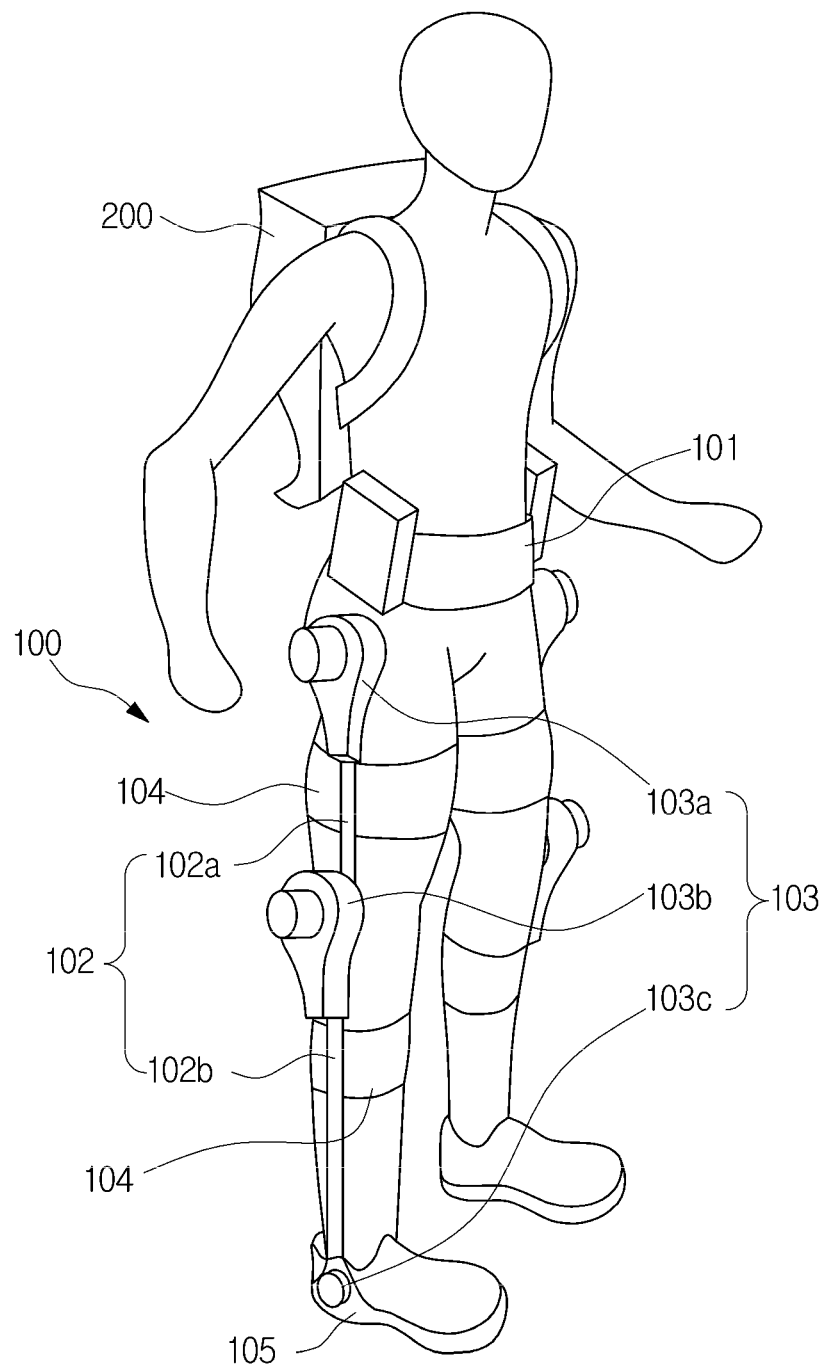
FIG. 1 is a diagram illustrating an appearance of a wearable robot according to some example embodiments.

Purposes, specific advantages, and novel features of the invention will be apparent from exemplary embodiments and the following detailed descriptions in connection with the accompanying drawings. In this specification, when reference numerals are assigned to components of each drawing, it should be noted that, when the same components are illustrated in different drawings, the same numerals are assigned to the same components whenever possible. In descriptions of the invention, when detailed descriptions of related well-known technology are deemed to unnecessarily obscure the gist of the invention, they will be omitted. In this specification, although the terms first, second, etc. are used to distinguish one component from another, these components are not limited by these terms.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used, herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Hereinafter, a wearable robot according to some example embodiments and a method of controlling the same will be described in detail with reference to the accompanying drawings.

Example embodiments will be described with a robot for assisting with lower extremity muscle strength as an example among wearable robots. However, the example embodiments does not apply specifically to only the robot for assisting with lower extremity muscle strength, but may apply to any wearable robot that assists with muscle strength of a wearer FIG. 1 is a diagram illustrating an appearance of a wearable robot according to some example embodiments.

As illustrated in FIG. 1, the wearable robot according to the embodiment may include a mechanical unit 100 and a control unit 200.

The mechanical unit 100 is configured as a mechanism for assisting the wearer with walking, and may include components such as a joint for a walking motion, an actuator such as a motor and hydraulic and pneumatic cylinders, and a belt for attachment to a leg. This mechanical unit 100 may assist with the walking motion of the wearer by operation of the joint and the actuator.

Specifically, as illustrated in FIG. 1, the mechanical unit 100 may include a waist wearing unit 101, a supporting unit 102, a joint unit 103, a fixing unit 104, and the like.

The waist wearing unit 101 is a unit that is worn around a waist of the wearer, and may be implemented so as to be modified according to a shape or a size of the waist of the wearer, but example embodiments are not limited thereto. Therefore, the waist wearing unit 101 may stably support a waist of a body according to a body shape of the wearer without modification.

Although not specifically illustrated in FIG. 1, the waist wearing unit 101 may include a waist support (not illustrated) for stably supporting the waist of the wearer and a band unit (not illustrated) that is formed to wrap around an abdominal portion of the wearer.

Since the waist wearing unit 101 made of the band unit (not illustrated) and the waist support (not illustrated) in this way may wrap around an abdomen and a back of a waist portion of the wearer, it is possible to minimize a load burden applied to the waist of the wearer.

The supporting unit 102 supports walking of the wearer and may include a first support frame 102a and a second support frame 102b, which may have constant lengths, as illustrated in FIG. 1. In this case, the first support frame 102a and the second support frame 102b may be formed in the form of bars having plate shapes, but example embodiments are not limited thereto.

The first support frame 102a may be positioned above a knee of the wearer, an end of the first support frame 102a may be connected to the aforementioned waist wearing unit 101, and the other end may be connected to the second support frame 102b. In addition, the second support frame 102b may be positioned below the knee of the wearer, an end of the second support frame 102b may be connected to the first support frame 102a, and the other end may be connected to a shoe unit 105.

In this case, a part connecting the end of the first support frame 102a and the waist wearing unit 101, a part connecting the other end of the first support frame 102a and the end of the second support frame 102b, and a part connecting the other end of the second support frame 102b and the shoe unit 105 may be rotatably connected to each other, but example embodiments are not limited thereto.

Further, each connecting part may have at least one degree of freedom (DOF), but example embodiments are not limited thereto. The term "degrees of freedom (DOF)" refers to degrees of freedom in forward kinematics or inverse kinematics. The degrees of freedom of the mechanism refer to the number of variables that determine the number of independent movements of the mechanism or independent movement of a relative position between links. For example, an object in a 3D space formed by x, y, and z axes has at least one degree of freedom among three degrees of freedom (positions along each axis) for determining a spatial position of the object and three degrees of freedom (rotation angles about each axis) for determining a spatial posture (orientation) of the object. Specifically, when the object can move along each axis and rotate about each axis, the object may be understood to have six degrees of freedom.

In addition, the first support frame 102a and the second support frame 102b may be adjusted to have a length corresponding to a length of a leg of the wearer.

As illustrated in FIG. 1, the joint unit 103 may include a first joint 103a, a second joint 103b, and a third joint 103c, but the invention is not limited thereto.

The first joint 103a is provided in the aforementioned part connecting the end of the first support frame 102a and the waist wearing unit 101, and enables bending between a hip and a thigh. The second joint 103b is provided at the part connecting the other end of the first support frame 102a and the end of the second support frame 102b, and enables bending of the knee. The third joint 103c is provided in the part connecting the other end of the second support frame 102b and the shoe unit 105, and enables bending of an ankle.

As discussed below with reference to FIG. 2, a driving unit 110 may be provided in the first joint 103a, the second joint 103b, and the third joint 103c.

The driving unit 110 is configured to deliver driving force for rotary movement to the aforementioned first joint 103a, second joint 103b, and third joint 103c.

For example, the driving unit 110 may include a pair of gears (not illustrated) provided in each connecting part and a driving motor (not illustrated) that is connected to an axis of either gear of the pair of gears and is driven by receiving an electrical signal from the control unit 200, but example embodiments are not limited thereto. Instead of the driving motor (not illustrated), pneumatic and hydraulic methods may also be used.

Due to the driving force delivered from this driving unit 110, the first support frame 102a and the second support frame 102b may move with respect to the waist, the knee, and the ankle. Accordingly, it is possible to bend between the hip and the thigh, the knee, and the ankle.

As discussed below with reference to FIG. 2, a joint angle measurement unit 300 configured to detect a joint angle of each joint 103 may be further included in the wearable robot. The joint angle measuring unit 300 may include a first sensor 310, a second sensor 320, and a third sensor 330, which are configured to detect the joint angles of the first joint 103a, the second joint 103b, and the third joint 103c, respectively. Encoders, potentiometers, or the like may be used as the first sensor 310, the second sensor 320, and the third sensor 330, but example embodiments are not limited thereto. In some example embodiments, the first sensor 310, the second sensor 320, and the third sensor 330 may be provided in the driving motor (not illustrated) of the driving unit 110.

A fixing unit 104 is a unit that fixes the first support frame 102a and the second support frame 102b on a lower extremity of the wearer, and may be implemented as a band, a belt, or the like, but example embodiments are not limited thereto. In this way, the first support frame 102a and the second support frame 102b are fixed above and below the knee, respectively, using the fixing unit 104. Therefore, the moving first support frame 102a and second support frame 102b are able to stably assist with the lower extremity muscle strength of the wearer.

In addition, the mechanical unit 100 may further include the shoe unit 105. The shoe unit 105 may be configured to wrap around a foot of the wearer and determine a walking state of the wearer.

The shoe unit 105 may be configured to wrap around and protect the foot of the wearer, and measure the walking state of the wearer. As described above, a side surface of the shoe unit 105 may be rotatably connected to the other end of the second support frame 102b.

In addition, the driving motor (not illustrated) of the driving unit 110 for the second joint 103b is connected to the upper part of the shoe unit 105 combined with the second support frame 102b using a wire or the like. Therefore, a bending angle of the ankle may be determined according to an angle changed by driving of the driving motor (not illustrated).

Figure 3:
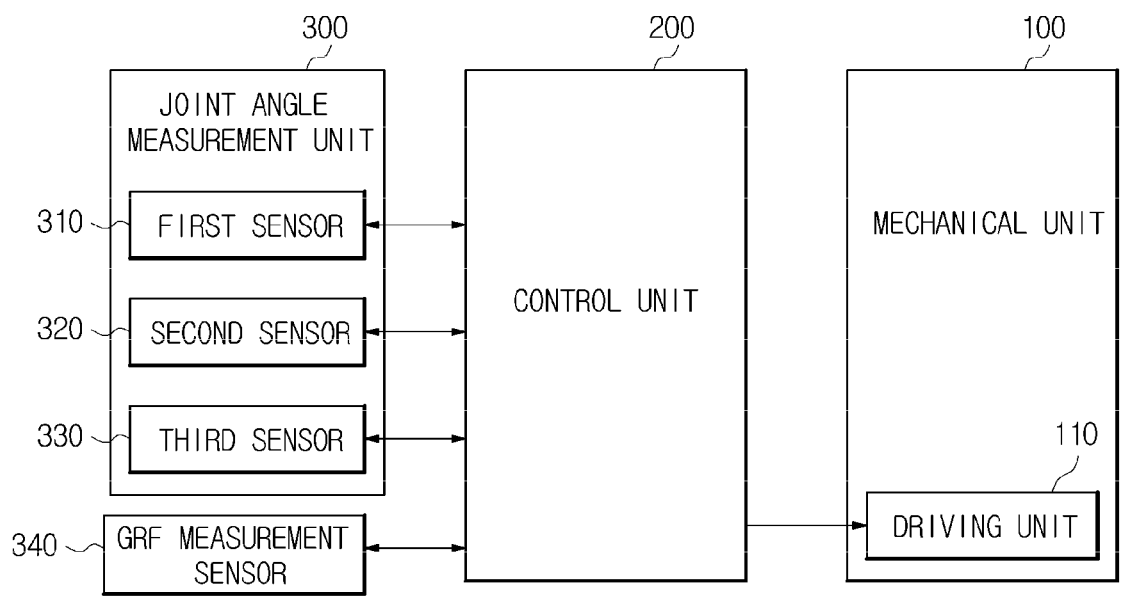
FIG. 3 is a block diagram illustrating a configuration of a wearable robot according to some example embodiments.

As illustrated in FIG. 3, a ground reaction force (GRF) measurement sensor 340 may be provided in a bottom of the shoe unit 105. Here, the GRF measurement sensor 340 is configured to measure GRF exerted on a bottom of the foot of the wearer from the ground. Here, when gravity is exerted on the ground or internal force in a body is exerted on the ground, the GRF refers to force exerted from the ground to the body that has the same magnitude as the gravity or the internal force and an opposite direction thereof. That is, it may be understood as the force exerted by the wearer contacting the ground.

In some example embodiments, a force sensing resistor (FSR), a pressure sensor, or the like may be used as the GRF measurement sensor 340, but example embodiments are not limited thereto.

In addition, in order for the wearer to easily and simply put on and take off the shoe unit 105, the shoe unit 105 may further include a fastening unit (not illustrated) such as a Velcro fastener, and a snap fastener in the upper part, and thus a one touch type fixing structure may be made.

In addition, the mechanical unit 100 may further include a power supply unit (not illustrated) for supplying power. In some example embodiments, a battery may be used as the power supply unit (not illustrated) such that the wearer can walk freely, but example embodiments are not limited thereto.

Figure 2:
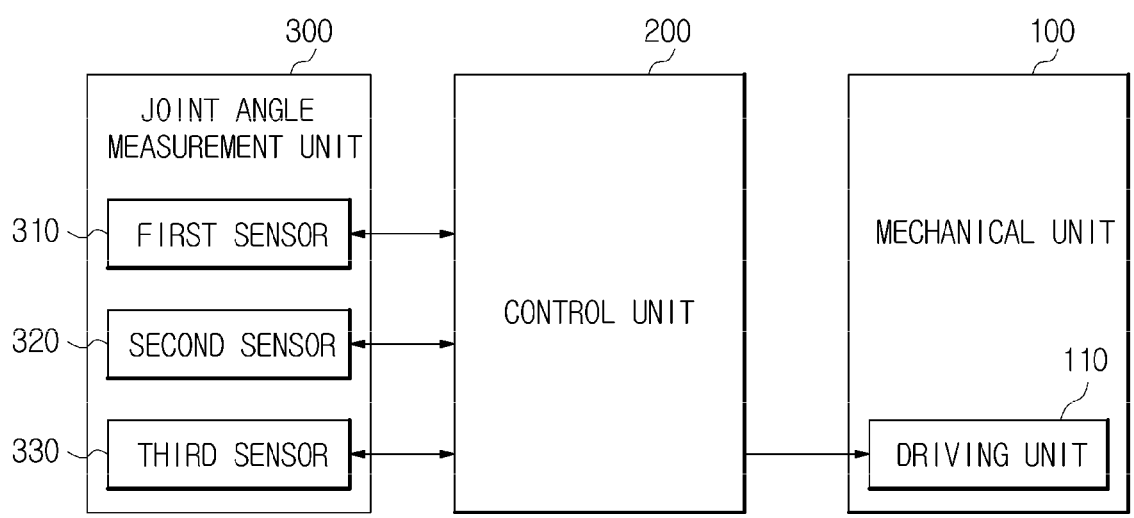
FIG. 2 is a block diagram illustrating a configuration of a wearable robot according to some example embodiments.

FIG. 2 is a block diagram illustrating a configuration of a wearable robot according to some example embodiments. FIG. 3 is a block diagram illustrating a configuration of a wearable robot according to other example embodiments.

As illustrated in FIG. 2, the wearable robot according to this embodiment may include the joint angle measurement unit 300, the control unit 200, and the mechanical unit 100.

The joint angle measurement unit 300 may include the first sensor 310, the second sensor 320, and the third sensor 330. As described above, the first sensor 310 may be configured to measure the joint angle of the first joint 103a, the second sensor 320 may be configured to measure the joint angle of the second joint 103b, and the third sensor 330 may be configured to measure the joint angle of the third joint 103c.

In some example embodiments, encoders, potentiometers, or the like may be used as the first sensor 310, the second sensor 320, and the third sensor 330, but example embodiments are not limited thereto.

In addition, the first sensor 310, the second sensor 320, and the third sensor 330 may be provided in each driving motor (not illustrated) that delivers driving force to the first joint 103a, the second joint 103b, and the third joint 103c, but example embodiments are not limited thereto.

In addition, the joint angle of the first joint 103a, the joint angle of the second joint 103b, and the joint angle of the third joint 103c, which are measured using the first sensor 310, the second sensor 320, and the third sensor 330, respectively, may be provided to the control unit 200 to be described.

Hereinafter, for convenience of description, the joint angle of the first joint 103a is referred to as a first joint angle, the joint angle of the second joint 103b is referred to as a second joint angle, and the joint angle of the third joint 103c is referred to as a third joint angle. In some example embodiments, the first joint, the second joint, and the third joint may be understood as the hip joint, the knee joint, and the ankle joint, respectively.

Further, as illustrated in FIG. 3, in addition to the first sensor 310, second sensor 320 and third sensor 330, the wearable robot may further include the GRF measurement sensor 340.

As described above, the GRF measurement sensor 340 may be provided in the bottom of the shoe unit 105 corresponding to the bottom of the foot of the wearer and may be configured to measure the GRF exerted on the bottom of the foot of the wearer from the ground.

As discussed in more detail below, the GRF measured through the GRF measurement sensor 340 may be used to determine a current motion state of the wearer.

The control unit 200 may be configured to control overall operations of the wearable robot.

The control unit 200 may include a processor and a memory (not shown).

Figure 11:
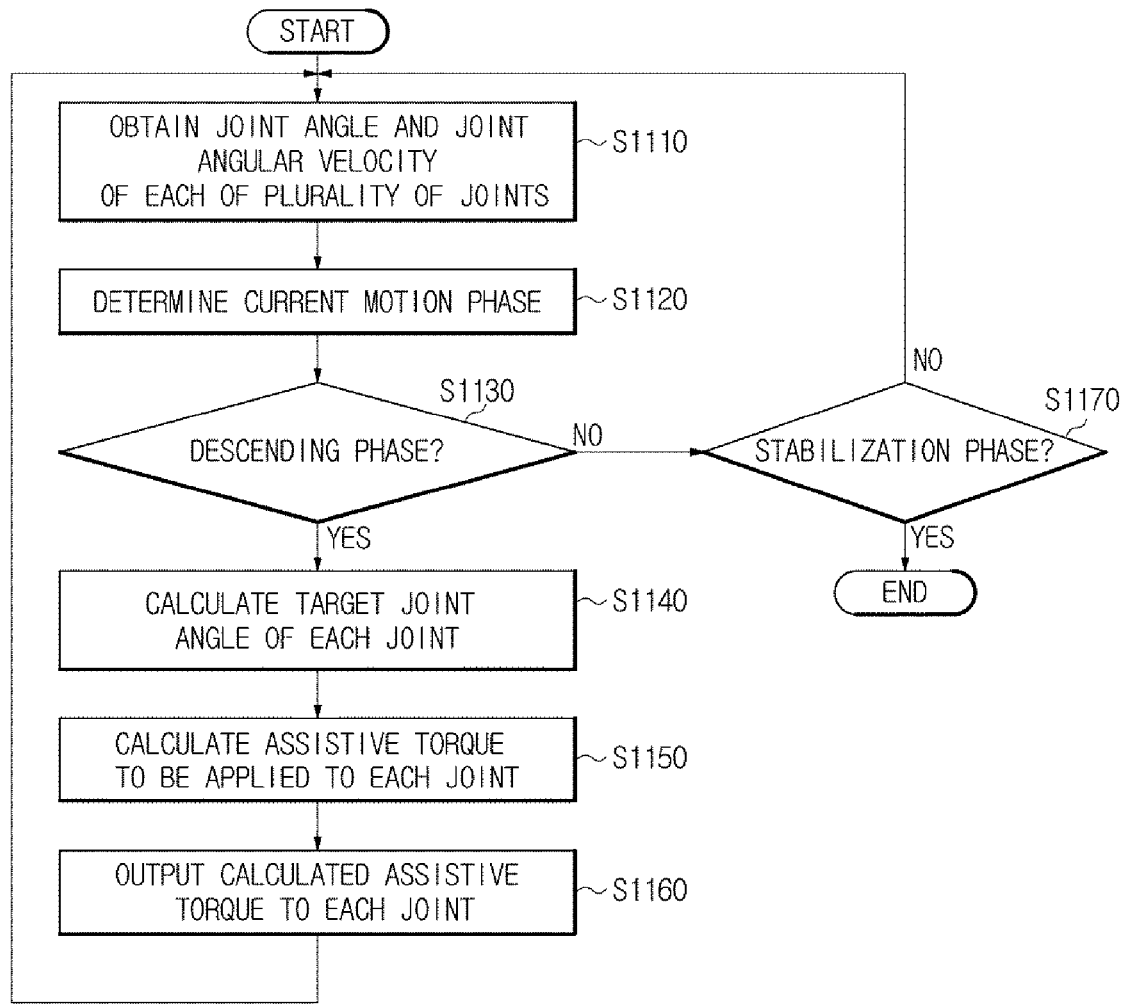
FIG. 11 is a flowchart sequentially illustrating a method of controlling a wearable robot according to some example embodiments.
Figure 12:
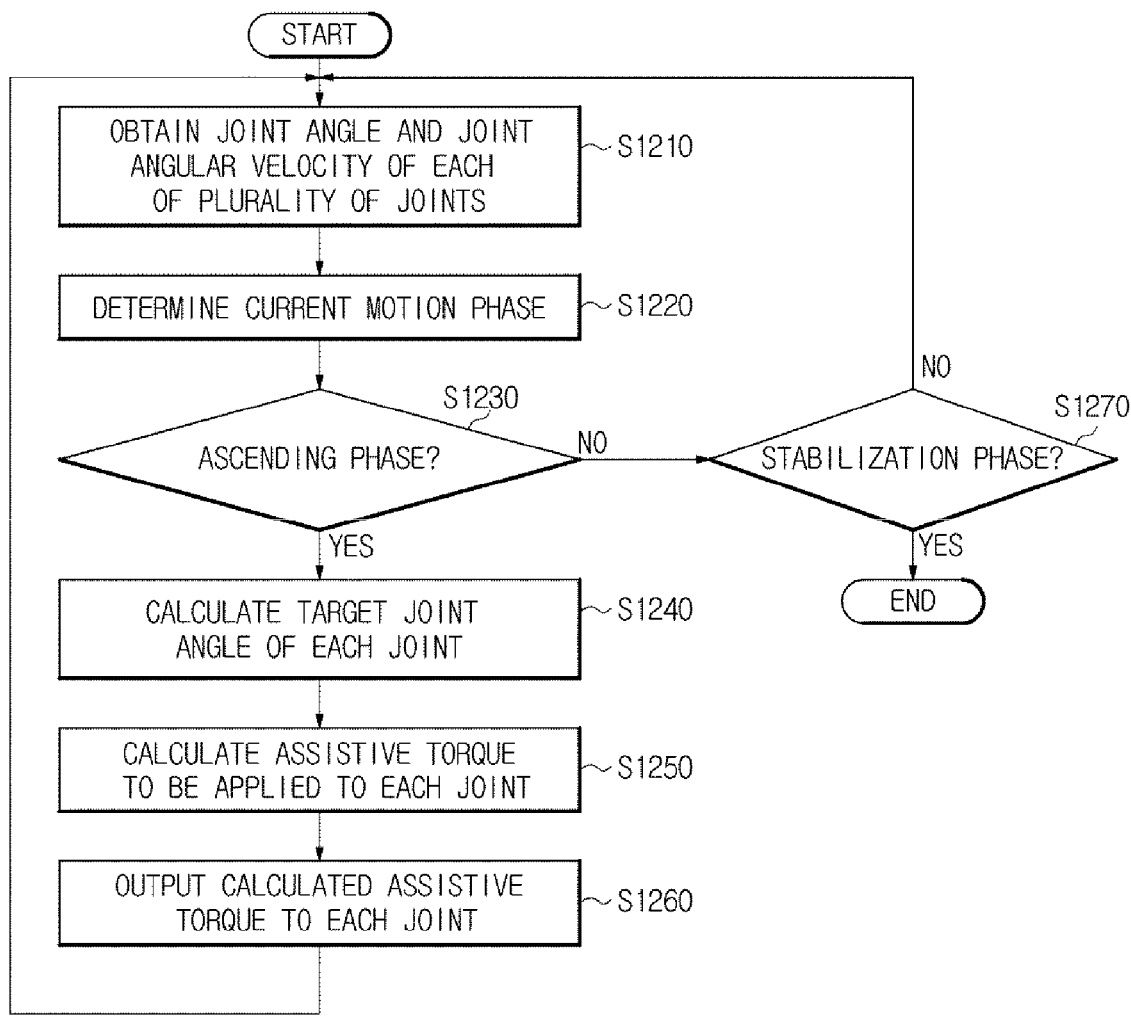
FIG. 12 is a flowchart sequentially illustrating a method of controlling a wearable robot according to other example embodiments.

The processor may be an arithmetic logic unit, a digital signal processor, a microcomputer, a field programmable array, a programmable logic unit, a microprocessor or any other device capable of responding to and executing instructions in a defined manner such that the processor is programmed with instructions that configure the controller as a special purpose computer to perform the operations illustrated in FIGS. 11 and 12, such that the controller is configured to calculate an amount of assistance torque to apply to joints by determining a target joint angle of the joints based on a current joint angle and a current joint angular velocity of other joints.

In some example embodiments, the control unit 200 may calculate assistive torque to be applied to each of the joints 103a, 103b, and 103c using the first joint angle, the second joint angle, and the third joint angle provided from the aforementioned first sensor 310, second sensor 320, and third sensor 330, and transmit a control signal for generating the calculated assistive torque to the mechanical unit 100.

In some example embodiments, the control unit 200 may calculate the assistive torque based on the joint angles and angular velocities.

The control unit 200 may receive the first joint angle, the second joint angle, and the third joint angle from the first sensor 310, the second sensor 320, and the third sensor 330, respectively, differentiate the received first joint angle, second joint angle, and third joint angle with respect to time, and thus calculate a first joint angular velocity, a second joint angular velocity, and a third joint angular velocity.

The control unit 200 may calculate assistive torque to be applied to the first joint 103a, the second joint 103b, and the third joint 103c using the first joint angle and the first joint angular velocity, the second joint angle and the second joint angular velocity, and the third joint angle and the third joint angular velocity, which are obtained using the above method.

This will be described in detail as follows.

Figure 4:
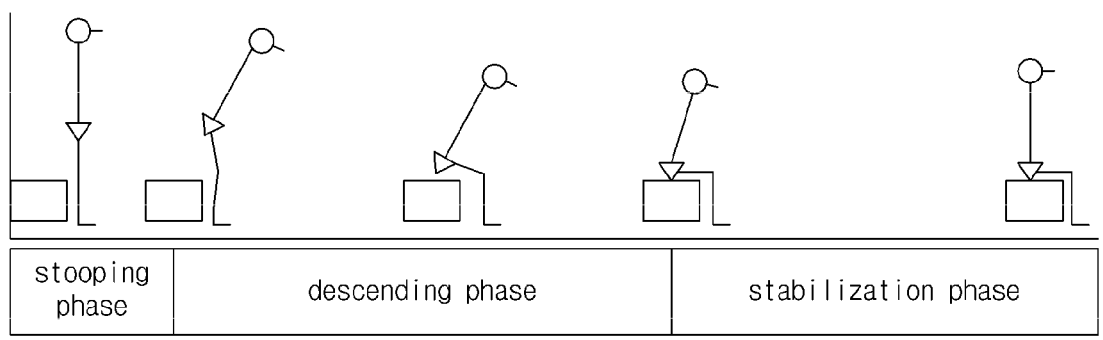
FIG. 4 is a conceptual diagram sequentially illustrating a sitting down motion of a wearer.
Figure 5:
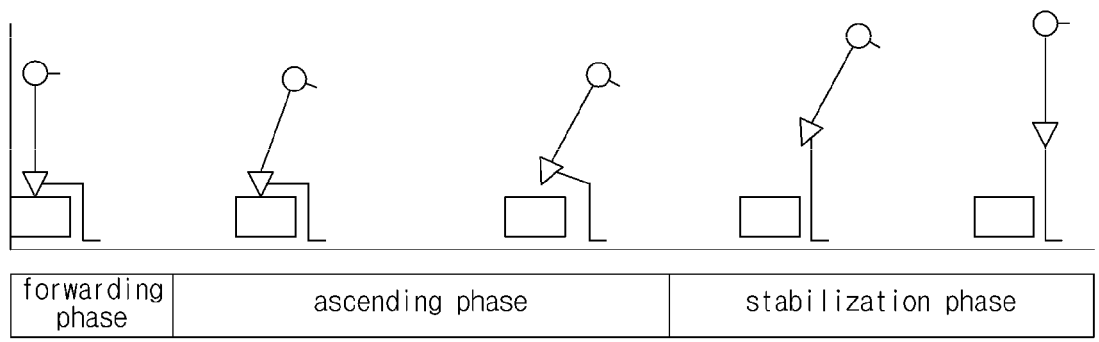
FIG. 5 is a conceptual diagram sequentially illustrating a standing up motion of the wearer.
Figure 6:
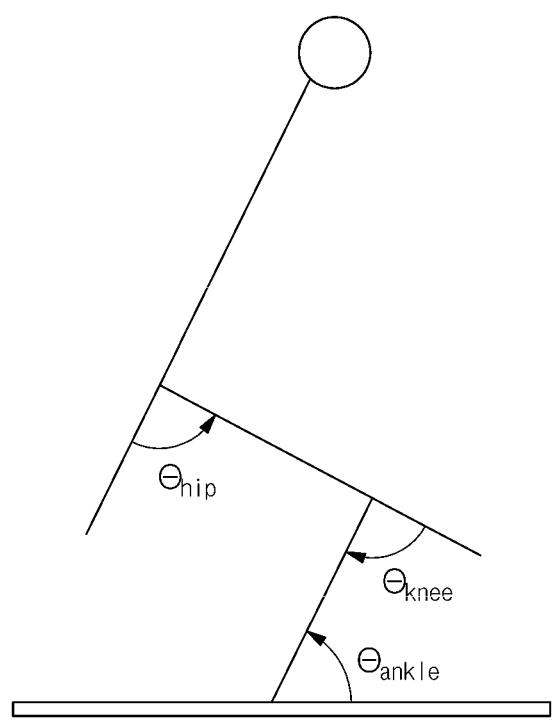
FIG. 6 is a diagram illustrating a hip joint position, a knee joint position and an ankle joint position which serve as joint angle measurement references.

FIGS. 4 and 5 respectively illustrate sequences of a sitting down motion and a standing up motion of the wearer.

As illustrated in FIG. 4, the sitting down motion of the wearer may be performed through a stooping phase of moving the waist slightly forward in a state of standing up, a descending phase of lowering the body while bending the waist and the knees, and a stabilization phase. Also, as illustrated in FIG. 5, the standing up motion of the wearer may be performed through a forwarding phase of leaning the upper body forward while sitting down, an ascending phase of elevating the body, and a stabilization phase.

When the wearer performs the sitting down motion and the standing up motion as illustrated in FIGS. 4 and 5, the joint angle of one or more joints may change according to the joint angles of other joints. For example, there may be correlations between the joint angles of the joints, therefore, the joint angle of each joint may change under an influence from a joint angle change of other joints.

Figure 7:
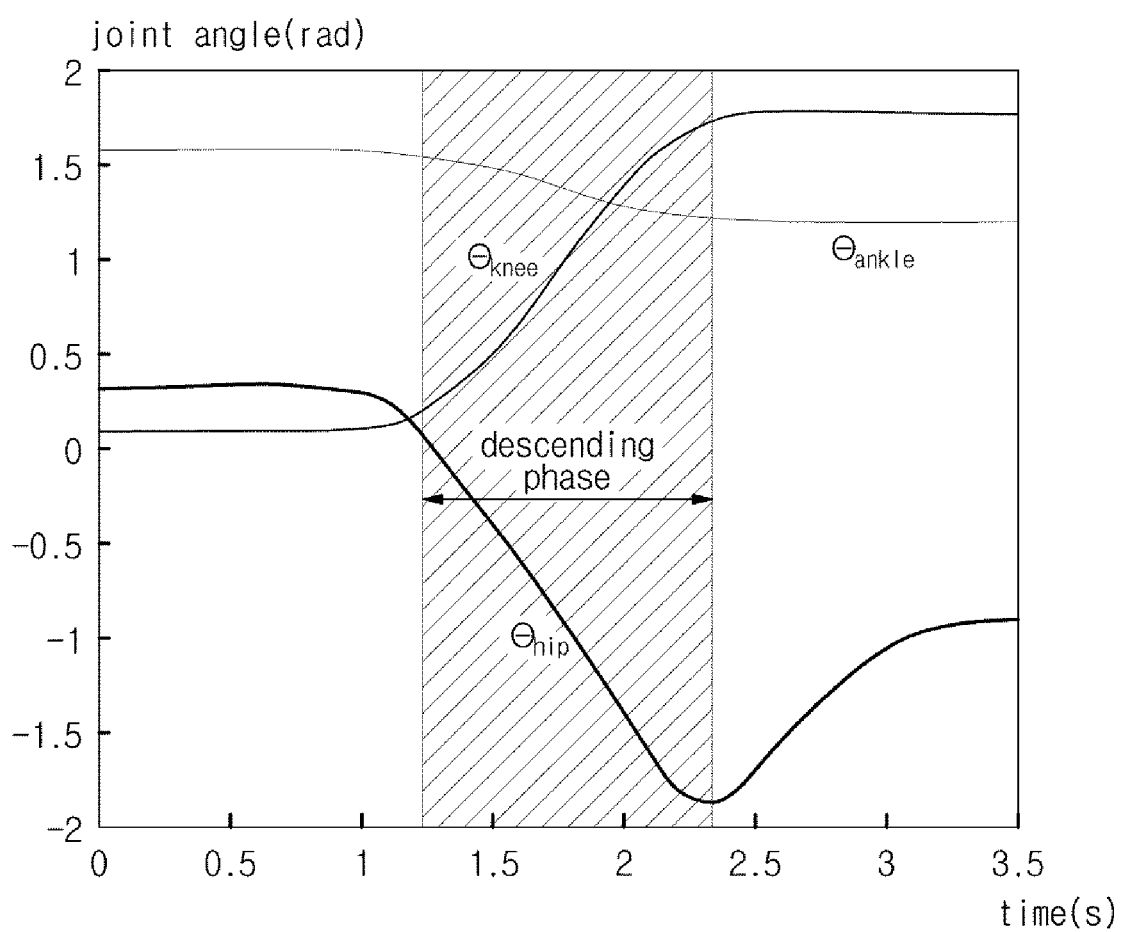
FIG. 7 is a graph illustrating an angle change of each joint according to a time change when the sitting down motion is performed.

FIG. 7 is a graph illustrating an angle change of each joint according to a time change when the sitting down motion is performed;

As illustrated in FIG. 7, while the wearer performs the sitting down motion, each of the joint angles of the first joint 103a, the second joint 103b and the third joint 103c may change over time. In this case, the joint angle of the first joint 103a, the joint angle of the second joint 103b, and the joint angle of the third joint 103c may serve as measurement references.

Figure 8:
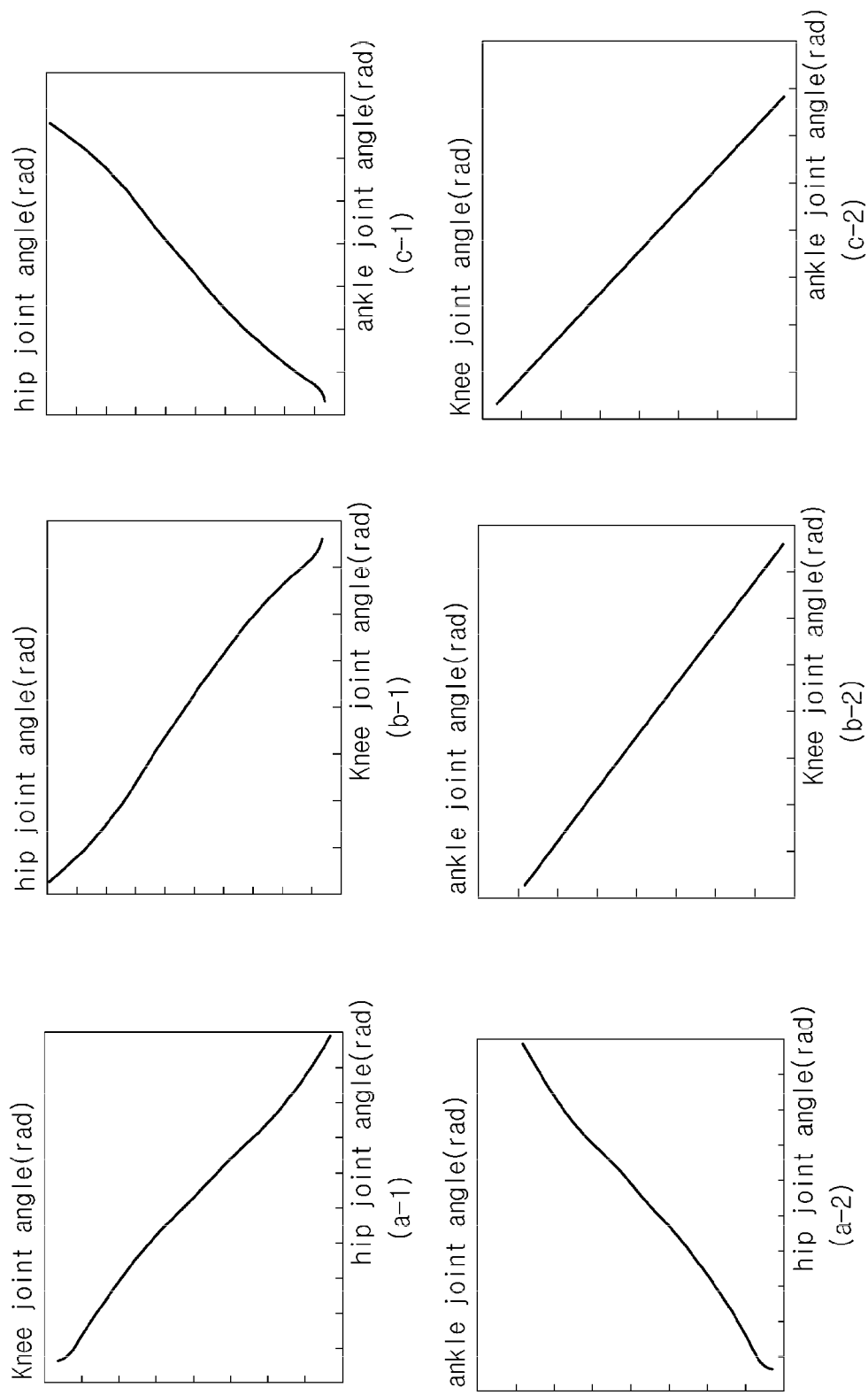
FIG. 8 shows graphs illustrating a relation between joint angles in a descending phase while the sitting down motion is performed.

FIG. 8 illustrates relations between the joint angles of the joints that change according to a time change while the sitting down motion is performed as illustrated in FIG. 7. In FIG. 8, the joint angle of the first joint 103a may be a hip joint angle, the joint angle of the second joint 103b may be a knee joint angle, and the joint angle of the third joint 103c may be an ankle joint angle.

As illustrated in FIG. 8, while the sitting down motion is performed, the knee joint angle may inversely change with respect to the hip joint angle change as illustrated in a graph (a-1), and the ankle joint angle may inversely change with respect to the hip joint angle change as illustrated in a graph (a-2). Similarly, the hip joint angle may inversely change with respect to the knee joint angle change as illustrated in a graph (b-1), and the ankle joint angle may inversely change with respect to the knee joint angle change as illustrated in a graph (b-2). Also, the hip joint angle may change with respect to the ankle joint angle change as illustrated in a graph (c-1), and the knee joint angle may change with respect to the ankle joint angle change as illustrated in a graph (c-2).

Figure 9:
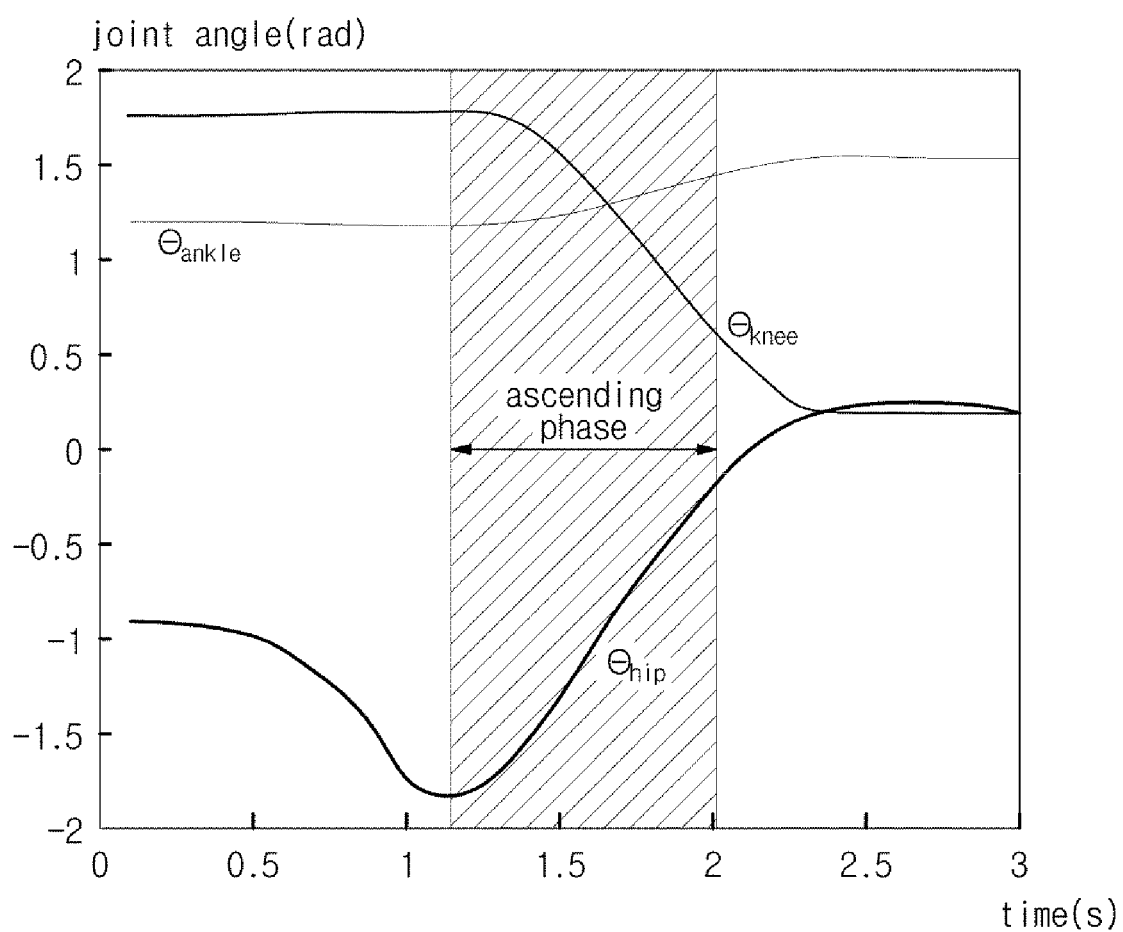
FIG. 9 is a graph illustrating an angle change of each joint according to a time change when the standing up motion is performed.
Figure 10:
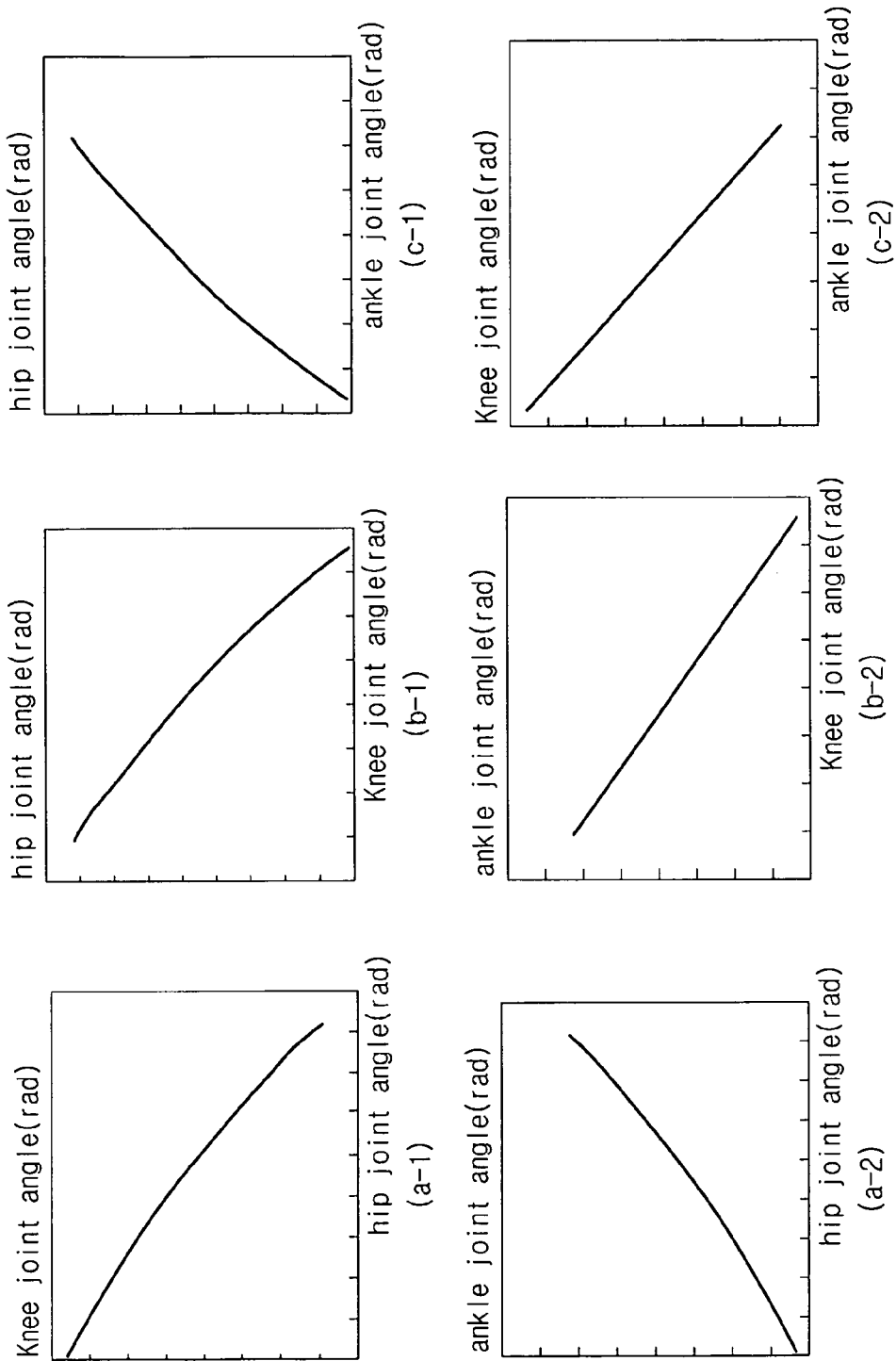
FIG. 10 shows graphs illustrating a relation between joint angles in an ascending phase while the standing up motion is performed.

FIG. 9 is a graph illustrating an angle change of each joint according to a time change when the standing up motion is performed. FIG. 10 illustrates relations between the joint angles of the joints that change according to a time change while the standing up motion is performed.

As illustrated in FIG. 9, while the wearer performs the standing up motion, one or more of the joint angles of the first joint 103a, the second joint 103b, and the third joint 103c may change.

As illustrated in FIG. 10, while the standing up motion is performed, the knee joint angle may inversely change with respect to the hip joint angle change as illustrated in a graph (a-1), and the ankle joint angle changes with respect to the hip joint angle change as illustrated in a graph (a-2). Similarly, the hip joint angle may inversely change with respect to the knee joint angle change as illustrated in a graph (b-1), and the ankle joint angle may inversely change with respect to the knee joint angle change as illustrated in a graph (b-2). In addition, the hip joint angle may change with respect to the ankle joint angle change as illustrated in a graph (c-1), and the knee joint angle may inversely change with respect to the ankle joint angle change as illustrated in a graph (c-2).

As a result, the joint angles of each of the joints may be related. Therefore, while the wearer performs the sitting down motion or the standing up motion, the joint angle of one or more of the joints may be influenced by the joint angle change of other joints.

Accordingly, in some example embodiments, as described above, the joint angle of each joint is measured, desirable target joint angles for other joints are calculated using the measured joint angle of each joint, and assistive torque is applied such that the joint angles of the other joints become the calculated target joint angles.

The control unit 200 may calculate a target joint angle of one joint among the plurality of joints using a joint angle and a joint angular velocity of at least one joint among the other joints.

For example, in order to calculate a target joint angle of the first joint 103a, the control unit 200 may utilize only a joint angle and a joint angular velocity of the second joint 103b, or only a joint angle and a joint angular velocity of the third joint 103c, or all of the joint angle and the joint angular velocity of the second joint 103b and the joint angle and the joint angular velocity of the third joint 103c.

Similarly, in order to calculate a target joint angle of the second joint 103b, the control unit 200 may utilize only a joint angle and a joint angular velocity of the first joint 103a, or only a joint angle and a joint angular velocity of the third joint 103c, or all of the joint angle and the joint angular velocity of the first joint 103a and the joint angle and the joint angular velocity of the third joint 103c. In order to calculate a target joint angle of the third joint 103c, the control unit 200 may utilize only a joint angle and a joint angular velocity of the first joint 103a, or only a joint angle and a joint angular velocity of the second joint 103b, or all of the joint angle and the joint angular velocity of the first joint 103a and the joint angle and the joint angular velocity of the second joint 103b.

For example, the control unit 200 may calculate the target joint angle of the first joint 103a by computing a function in which the target joint angle of the first joint 103a is set as an output value, and the joint angle and the joint angular velocity of the second joint 103b, or the joint angle and the joint angular velocity of the third joint 103c, or all of the joint angle and the joint angular velocity of the second joint 103b and the joint angle and the joint angular velocity of the third joint 103c are set as input values. The target joint angles of the second joint 103b and the third joint 103c may also be calculated by computing a function represented as above. In this case, the function may have a primary linear function type in which the graph shown in FIGS. 8 and 10 is approximated, but example embodiments are not limited thereto and various types of functions may be used.

Also, the control unit 140 may calculate assistive torque to be applied to each of the first joint 103a, the second joint 103b, and the third joint 103c using the target joint angle of the first joint 103a, the target joint angle of the second joint 103b, and the target joint angle of the third joint 103c, which are calculated as described above. The control unit 200 may calculate the assistive torque using the following method, but the calculating method is not limited thereto.

For example, the assistive torque to be applied to the first joint 103a may be calculated by computing a function in which assistive torque of the first joint 103a is set as an output value, and a difference value between the target joint angle of the first joint 103a and the first joint angle of the first joint 103a actually measured through the first sensor 310, and at least one joint angular velocity of the second joint angular velocity of the second joint 103b and the third joint angular velocity of the third joint 103c are set as input values. The assistive torque to be applied to the second joint 103b and the third joint 103c may also be calculated using the aforementioned method.

The control unit 140 may generate a control signal for generating the calculated assistive torque calculated and transmit the generated control signal to the driving unit 110 of the mechanical unit 100.

The driving unit 110 of the mechanical unit 100 may drive the driving motor (not illustrated) according to the control signal received from the control unit 140 and perform control such that each of the joint angles of the first joint 103a, the second joint 103b, and the third joint 103c reaches the target joint angle.

In some example embodiments, the control unit 140 may determine a current motion phase of the wearer using the first joint angle, the second joint angle, and the third joint angle of each joint measured through the joint angle measurement unit 300.

For example, as illustrated in FIGS. 4 and 5, when the wearer performs the sitting down motion or the standing up motion, the current motion phase of the wearer may include a stooping phase of moving the waist slightly forward in a state of standing up, a descending phase of lowering the body while bending the waist and the knees, a stabilization phase of straightening the waist and completely sitting down, a forwarding phase of leaning an upper body forward while sitting down, an ascending phase of elevating the body, and a stabilization phase of erecting the upper body and completely standing up.

Joint angles serving as a reference of each joint for each motion phase, that is, a first reference joint angle, a second reference joint angle, and a third reference joint angle, may be set (or, alternatively, preset). As described above, the control unit 140 may compare each of the first joint angle, the second joint angle, and the third joint angle, which are actually measured using the joint angle measurement unit 300, with the preset first reference joint angle, second reference joint angle, and third reference joint angle for each motion phase, and identifies a matching motion phase. Therefore, it is possible to determine the current motion phase of the wearer.

In other example embodiments, the control unit 140 may also determine the current motion phase of the wearer using the GRF measured using the aforementioned GRF measurement sensor 340.

That is, since the force exerted by the wearer contacting the ground may differ for each aforementioned motion phase, a reference GRF serving as a reference for each motion phase may be set (or, alternatively, preset). The control unit 140 may compares the GRF measured using the GRF measurement sensor 340 with the preset reference GRF for each motion phase, and identifies a matching motion phase. Therefore, it is possible to determine the current motion phase of the wearer.

While the method of determining, by the control unit 140, the current motion phase of the wearer has been described above, this is only an example and the method of determining the current motion phase of the wearer in the control unit 140 is not limited thereto.

In this way, after the current motion phase of the wearer is determined, the control unit 140 determines whether the determined current motion phase corresponds to a specific motion phase (for example, a phase of lowering the body or a phase of elevating the body). When it is determined that the current motion phase corresponds to the specific motion phase, the target joint angle of each joint is calculated as described above, the assistive torque to be applied to each joint is calculated using the calculated target joint angle, and then the calculated assistive torque may be output to each joint.

Referring back to FIG. 2, the mechanical unit 100 is configured as a mechanism for assisting with walking of the wearer, and may include components such as a joint for a walking motion, an actuator such as a motor and hydraulic and pneumatic cylinders, and a belt for attachment to a leg. The mechanical unit 100 may assist with the walking motion of the wearer by operation of the joint and the actuator.

Although not illustrated in FIGS. 2 and 3, as mentioned above, the mechanical unit 100 may include the waist wearing unit 101, the supporting unit 102, the joint unit 103, the fixing unit 104, and the shoe unit 105, but the invention is not limited thereto. Since each configuration has already been described above, description thereof will not be repeated.

As illustrated in FIGS. 2 and 3, the mechanical unit 100 may include the driving unit 110. The driving unit 110 is configured to deliver driving force for rotary movement to the aforementioned first joint 103a. In this case, the driving unit 110 may be provided in a number corresponding to the number of the joint units 103, but example embodiments are not limited thereto.

Also, although not illustrated in FIGS. 2 and 3, the wearable robot may further include a mode converting unit (not illustrated).

The mode converting unit (not illustrated) is configured to select a walking mode, a posture mode, a walking speed, and the like. Specifically, the mode converting unit (not illustrated) may include a walking mode converting unit (not illustrated) configured to select a walking mode for a flat road, a rough road, stairs, a slope, or the like, a posture mode converting unit (not illustrated) configured to select a posture for sitting, standing, or the like, and a walking speed converting unit (not illustrated) configured to select a walking speed such as fast, slow, medium, or the like, but example embodiments are not limited thereto.

The configuration of the wearable robot according to some example embodiments has been described above in which the joint angle of each of the plurality of joints is detected, the target joint angle of each joint is calculated based on the joint angle of the other joints, and the assistive torque is applied to reach the calculated target joint angle. Accordingly, the joints are connected and organically operated.

In addition, since a motion intention of the wearer such as a motion speed change or motion stop is reflected in real time and corresponding assistive torque is generated and applied, it is possible to adjust the assistive torque in real time according to the motion intention of the wearer, and it is possible to prevent the wearer from feeling discomfort.

Hereinafter, a method of controlling a wearable robot will be described.

FIG. 11 is a flowchart sequentially illustrating a method of controlling a wearable robot according to some example embodiments.

As illustrated in FIG. 11, in operation S1110, the control unit 200 may obtain the joint angle and the joint angular velocity of each of the plurality of joints.

As illustrated in FIG. 1, the plurality of joints may include the first joint 103a, the second joint 103b, and the third joint 103c, but example embodiments are not limited thereto. The first joint 103a may be the hip joint, the second joint 103b may be the knee joint, and the third joint 103c may be the ankle joint.

The control unit 200 may obtain the joint angles of the first joint 103a, the second joint 103b, and the third joint 103c may be detected using the first sensor 310, the second sensor 320, and the third sensor 330, which are provided in the driving unit 110 that delivers driving force to each joint. Encoders, potentiometers, or the like may be used as the first sensor 310, the second sensor 320, and the third sensor 330, but example embodiments are not limited thereto.

Also, the control unit 200 may obtain the joint angular velocities of the first joint 103a, the second joint 103b, and the third joint 103c by differentiating the joint angle detected as described above with respect to time, but example embodiments are not limited thereto.

Hereinafter, for convenience of description, the joint angle and the joint angular velocity of the first joint 103a are referred to as the first joint angle and the first joint angular velocity, respectively. The joint angle and the joint angular velocity of the second joint 103b are referred to as the second joint angle and the second joint angular velocity, respectively. The joint angle and the joint angular velocity of the third joint 103c are referred to as the third joint angle and the third joint angular velocity, respectively.

In operation S1120, the control unit 200 may determine the current motion phase of the wearer.

The control unit 200 may utilize one or more of the following two methods to determine the current motion phase of the wearer, but example embodiments are not limited thereto.

In a first method, the control unit 200 may determine the current motion phase using the first joint angle, the second joint angle, and the third joint angle obtained in the aforementioned operation of S1110. Detailed description thereof is as follows.

For example, as illustrated in FIG. 4, the sitting down motion may include motion phases such as the stooping phase of bending the waist forward, the descending phase of lowering the body, and the stabilization phase of straightening the waist and completely sitting down. As illustrated in FIG. 5, the standing up motion may include motion phases such as the forwarding phase of leaning the upper body forward, the ascending phase of elevating the body, and the stabilization phase of erecting the upper body and completely standing up.

The control unit 200 may set (or alternatively, preset) the first reference joint angle, the second reference joint angle, and the third reference joint angle, which serve as references for each motion phase. The control unit 200 may compare actual first joint angle, second joint angle, and third joint angle, which are obtained in the operation of S1110 with the preset first reference joint angle, second reference joint angle, and third reference joint angle for each motion phase, respectively, to identify a matching motion phase, and thus the current motion phase is determined.

In the second method, the control unit 200 may determine the current motion phase based on the GRF measured through the GRF measurement sensor 340 provided in the bottom of the shoe unit 105. The control unit 200 may set (or, alternatively, preset) a reference GRF serving as a reference for each aforementioned motion phase. The control unit 200 may compare the measured GRF with the preset reference GRF for each motion phase, and identify a matching motion phase, and thus the current motion phase is determined.

The method of determining the current motion phase of the wearer has been described above using two examples, but the method of determining the current motion phase of the wearer is not limited thereto.

In operations S1130 to S1160, the control unit 200 determines whether the current motion phase corresponds to a specific motion phase, the target joint angle of one joint among the plurality of joints is calculated according to a determination result, the assistive torque to be applied to a corresponding joint is calculated using the calculated target joint angle, and then the calculated assistive torque is output to the corresponding joint. Here, the specific motion phase may correspond to the phase of lowering the body of the sitting down motion and may correspond to the phase of elevating the body of the standing up motion, but the invention is not limited thereto.

For example, in operation S1130, the control unit 200 determines whether the current motion phase corresponds to the descending phase. When the current motion phase corresponds to the descending phase, in operation S1140, the control unit may calculate the target joint angle of each joint. On the other hand, when the current motion phase does not correspond to the descending phase, in operation S1170, the control unit 200 may determine whether the current motion phase corresponds to the stabilization phase. When the current motion phase corresponds to the stabilization phase, the control unit 200 may stop driving and the process returns to the aforementioned operation of S1110 and the joint angle and the joint angular velocity of each joint are obtained again.

If the control unit 200 determines that the current motion phase corresponds to the descending phase, the control unit 200 may calculate the target joint angle of each joint based on the joint angle and the joint angular velocity of the other joints. Hereinafter, for convenience of description, the target joint angle of the first joint 103a is referred to as the first target joint angle, the target joint angle of the second joint 103b is referred to as the second target joint angle, and the target joint angle of the third joint 103c is referred to as the third target joint angle.

In some example embodiments, the first target joint angle of the first joint may be calculated using the second joint angle and the second joint angular velocity, may be calculated using the third joint angle and the third joint angular velocity, or may be calculated using all of the second joint angle, the second joint angular velocity, the third joint angle, and the third joint angular velocity.

Similarly, the second target joint angle of the second joint may be calculated using the first joint angle and the first joint angular velocity, may be calculated using the third joint angle and the third joint angular velocity, or may be calculated using all of the first joint angle, the first joint angular velocity, the third joint angle, and the third joint angular velocity.

Also, the third target joint angle of the third joint may be calculated using the first joint angle and the first joint angular velocity, may be calculated using the second joint angle and the second joint angular velocity, or may be calculated using all of the first joint angle, the first joint angular velocity, the second joint angle, and the second joint angular velocity.

That is, the target joint angle of any joint among the plurality of joints may be calculated using the joint angle and the joint angular velocity of at least one joint among joints other than a corresponding joint. That is, the joint angle to be reached in the corresponding joint is calculated using the joint angle of another joint. This is because there are correlations between the joint angles of the joints as described above. In other words, this is because the joint angle of each joint is influenced by the joint angle changes of the other joints.

Accordingly, the control unit 200 may set a function in which the target joint angle of one joint among the plurality of joints as an output value, and the joint angle and the joint angular velocity of at least one joint among other joints are set as input values is represented. The control unit 200 assigns the joint angle and the joint angular velocity obtained through the operation of S1110 to input values of a corresponding function, and thus it is possible to calculate the target joint angle of a corresponding joint.

For example, in order to calculate the target joint angle of the first joint 103a, the control unit 200 may set a function in which the target joint angle of the first joint 103a as an output value, and the joint angle and the joint angular velocity of the second joint 103b, or the joint angle and the joint angular velocity of the third joint 103c, or all of the joint angle and the joint angular velocity of the second joint 103b and the joint angle and the joint angular velocity of the third joint 103c are set as input values is represented. It is possible to obtain the target joint angle of the first joint 103a by assigning the joint angle and the joint angular velocity of the joint corresponding to the input value among the joint angle and the joint angular velocity of each joint obtained through the operation of S1110 to the corresponding function. The target joint angle of the second joint 103b and the target joint angle of the third joint 103c may also be calculated using the same method.

In operation S1150, the control unit 200 calculates the assistive torque to be applied to each joint using the target joint angle of each joint calculated through the aforementioned operation of S1140. For example, the control unit 200 calculates the assistive torque that will be applied to enable the joint angle of each joint obtained through the operation of S1110 to reach the target joint angle calculated through the operation of S1140.

The control unit 200 may calculate the assistive torque by computing a function in which a difference value between the target joint angle of a corresponding joint calculated through the operation of S1140 and the joint angle of the corresponding joint obtained through the operation of S1110, and the joint angular velocity of at least one joint among other joints obtained through the operation of S1110 are set as input values.

For example, in order to calculate assistive torque to be applied to the first joint 103a, it is possible to obtain the assistive torque serving as an output value by computing a function in which a difference value between the target joint angle of the first joint 103a calculated through the operation of S1140 and the first joint angle of the first joint 103a actually measured through the operation of S1110, the second joint angular velocity, or the third joint angular velocity, or all of the second joint angular velocity and the third joint angular velocity are set as input values.

In operation S1160, the control unit may output the assistive torque to the driving unit for driving the corresponding joint. For example, this operation may be performed such that the control unit 200 generates a control signal for generating the calculated assistive torque and the generated control signal is transmitted to the driving unit 110.

FIG. 12 is a flowchart sequentially illustrating a method of controlling a wearable robot according to other example embodiments.

Referring to FIG. 12, FIG. 12 illustrates a method applied when the wearer performs the standing up motion. During the standing up motion, processes other than a process of determining whether the current motion phase corresponds to the ascending phase corresponding to the standing up motion may be the same as the processes discussed in FIG. 11 with regard to a sitting down motion, therefore, detailed description of the same processes will not be repeated.

As illustrated in FIG. 12, in the method of controlling the wearable robot according to some example embodiments, in operation S1210, the control unit 200 may obtain the joint angle and the joint angular velocity of each of the plurality of joints.

In operations S1220 and S1230, the control unit 200 may determine the current motion phase of the wearer and whether the determined current motion phase corresponds to the ascending phase of elevating the body.

In operation S1240, when the current motion phase corresponds to the ascending phase, the control unit 200 may calculate the target joint angle of each joint. When the current motion phase does not correspond to the ascending phase, the control unit 200 may determine whether the determined current motion phase corresponds to the stabilization phase. When the current motion phase corresponds to the stabilization phase, the control unit 200 stops driving, and returns to the aforementioned operation of S1210 and the joint angle and the joint angular velocity of each joint are obtained again.

In operation S1250, the control unit 200 calculates the assistive torque to be applied to each joint using the target joint angle of each joint calculated through the aforementioned operation of S1240. In operation S1260, the control unit 200 outputs the calculated assistive torque to the driving unit for driving the corresponding joint.

Some example embodiments have been described above. In the aforementioned example embodiments, some components of the wearable robot may be implemented as a kind of module. Here, the term "module" refers to software or a hardware component such as a field programmable gate array (FPGA) or an application specific integrated circuit (ASIC), and the module can perform certain functions. However, the module is not limited to software or hardware. The module may be configured in a non-transitory recording medium that can be addressed or may be configured to execute at least one processor.

Examples of the module may include software components, object-oriented software components, class components, components such as task components, processes, functions, properties, procedures, subroutines, segments in program codes, drivers, firmware, microcodes, circuits, data, databases, data structures, tables, arrays, and variables. Components and functions provided from modules may be combined into a smaller number of components and modules or may be further separated into additional components and modules. In addition, the components and modules may execute at least one CPU in a device.

Some example embodiments may be implemented through a medium including a computer readable code or instruction for controlling at least one processor, for example, a non-transitory computer readable recording medium. The medium may correspond to a medium or media which enable the computer readable code to be stored and/or transmitted.

The computer readable code may be recorded in the medium or transmitted via the Internet. Examples of the medium may include a ROM, a RAM, a CD-ROM, a magnetic tape, a floppy disk, an optical recording medium, and a carrier wave such as data transmission via the Internet. The media may include non-transitory computer readable media. The medium may be a distributed network and thus the computer readable code may be stored, transmitted, or executed in a distributed manner.

Moreover, examples of the processor may be a computer processor, and the processor may be distributed and/or included in a single device.

Example embodiments have been described in detail with reference to some example embodiments. However, example embodiments should be considered in a descriptive sense only, and the example embodiments are not limited thereto. It will be apparent to those skilled in the art that various modifications and improvements within the scope of the example embodiments may be made.

Modifications and alternations of the invention fall within the scope of the example embodiments and the scope of the example embodiments is defined by the accompanying claims.

What is claimed is:

1. A method of controlling a wearable robot, comprising:
    obtaining a current joint angle and a current joint angular velocity of a plurality of joints of the wearable robot;
    determining a current motion phase of a wearer;
    calculating a target joint angle of one joint among the plurality of joint based on the current motion phase, the calculating including calculating the target joint angle of the one joint using the current joint angle and the current joint angular velocity of at least one other joint among the plurality of joints;
    calculating assistive torque to be applied to the one joint using the calculated target joint angle of the one joint; and
    outputting the calculated assistive torque to the one joint.

2. The method according to claim 1, wherein the calculating of the target joint angle of the one joint includes computing a function in which the current joint angle and the current joint angular velocity of the at least one other joint are set as input values.

3. The method according to claim 2, wherein the function is a primary linear function in which a relation between the current joint angle of the one joint and the current joint angle of the at least one other joint is approximated.

4. The method according to claim 1, wherein the calculating of the assistive torque to be applied to the one joint is performed by computing a function in which a difference value between the current joint angle and the calculated target joint angle of the one joint, and the current joint angular velocity of the at least one other joint are set as input values.

5. The method according to claim 1, wherein the obtaining of the current joint angle and the current joint angular velocity includes measuring the current joint angle using a sensor at each of the plurality of joints.

6. The method according to claim 5, wherein the obtaining the current joint angular velocity includes differentiating the current joint angle measured using the sensor with respect to time.

7. The method according to claim 1, wherein the determining the current motion phase of the wearer comprises:
    determining the current motion phase based on the current joint angle of the plurality of joints.

8. The method according to claim 7, wherein the determining of the current motion phase of the wearer includes, for each motion phase, comparing the current joint angle of each joint with a reference joint angle of each joint.

9. The method according to claim 1 comprising: measuring a ground reaction force (GRF) exerted on a bottom of a foot of a wearer, wherein
    the determining the current motion phase of the wearer comprises determining the current motion phase based on the measured GRF.

10. The method according to claim 9, wherein the determining of the current motion phase of the wearer includes, for each motion phase, comparing the measured GRF with a reference GRF.

11. The method according to claim 7, wherein the calculating the target joint angle of the one joint is performed when the current motion phase of the wearer corresponds to a specific motion phase.

12. A wearable robot, comprising:
  a plurality of joints;
  at least one sensor configured to measure current joint angles of the plurality of joints; and
  a controller configured to,
    obtain a current joint angular velocity of each joint using the measured current joint angles,
    determine a current motion phase of a wearer,
    calculate a target joint angle of one joint among the plurality of joint based on the current motion phase, the controller configured to calculate the target joint angle of the one joint using the current joint angle and the current joint angular velocity of at least one other joint among the plurality of joints; and
    calculate assistive torque to be applied to the one joint using the calculated target joint angle.

13. The wearable robot according to claim 12, wherein the controller is configured to calculate the target joint angle of the one joint by computing a function in which the current joint angle and the current joint angular velocity of the at least one other joint are set as input values.

14. The wearable robot according to claim 12, wherein the controller is configured to calculate the assistive torque by computing a function in which a difference value between the current joint angle and the calculated target joint angle of the one joint, and the current joint angular velocity of the at least one other joint are set as input values.

15. The wearable robot according to claim 12, wherein the controller is configured to obtain the joint angular velocity by differentiating the current joint angle with respect to time.

16. The wearable robot according to claim 12, wherein the controller is configured to determine the current motion phase of a wearer by, for each motion phase, comparing the current joint angle of each joint with a reference joint angle of each joint.

17. The wearable robot according to claim 16, wherein the controller is configured to determine whether the determined current motion phase of the wearer corresponds to a specific motion phase, and when the current motion phase of the wearer corresponds to the specific motion phase, calculates the assistive torque and the target joint angle of the one joint.

18. The wearable robot according to claim 12, further comprising:
  a ground reaction force (GRF) sensor configured to measure GRF exerted on a bottom of a foot of the wearer.

19. The wearable robot according to claim 18, wherein the controller is configured to determine the current motion phase of the wearer by, for each motion phase, comparing the measured GRF and a reference GRF.

* * * * *